(12) United States Patent
Chen

(10) Patent No.: US 11,161,441 B2
(45) Date of Patent: Nov. 2, 2021

(54) VEHICLE CONSOLE ASSEMBLY

(71) Applicant: Ford Global Technologies, LLC, Dearborn, MI (US)

(72) Inventor: Shiran Chen, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 223 days.

(21) Appl. No.: 16/576,829

(22) Filed: Sep. 20, 2019

(65) Prior Publication Data

US 2021/0086673 A1  Mar. 25, 2021

(51) Int. Cl.
*B60N 2/75* (2018.01)
*B60N 3/10* (2006.01)

(52) U.S. Cl.
CPC .............. *B60N 2/793* (2018.02); *B60N 2/77* (2018.02); *B60N 2/797* (2018.02); *B60N 3/101* (2013.01)

(58) Field of Classification Search
CPC ........ B60N 2/793; B60N 2/797; B60N 3/101; B60N 2/77; B60N 2/78; B60R 7/04
USPC ...................................................... 296/37.8
See application file for complete search history.

(56) References Cited

U.S. PATENT DOCUMENTS

| | | | |
|---|---|---|---|
| 6,481,799 B1 | 11/2002 | Whalen | |
| 8,943,650 B2 | 2/2015 | Anderson et al. | |
| 9,701,252 B2* | 7/2017 | Gofton | B60R 7/04 |
| 10,023,088 B2* | 7/2018 | Anderson | B60N 2/793 |
| 2009/0174206 A1* | 7/2009 | Vander Sluis | B60R 7/04 |
| | | | 296/24.34 |
| 2009/0174236 A1* | 7/2009 | Lota | B60N 2/773 |
| | | | 297/188.19 |
| 2013/0026778 A1* | 1/2013 | Biggs | B60R 7/04 |
| | | | 296/37.8 |

FOREIGN PATENT DOCUMENTS

| | | |
|---|---|---|
| EP | 0587104 A2 | 3/1994 |
| GB | 2397281 A | 7/2007 |
| JP | 2003200785 A | 7/2003 |

* cited by examiner

*Primary Examiner* — Pinel E Romain
(74) *Attorney, Agent, or Firm* — David Coppiellie; Price Heneveld LLP

(57) ABSTRACT

A console assembly includes a body that has a front portion and a rear portion. The body defines a support extension extending from a rear portion. The support extension includes a guide and a resilient member that defines a channel. A lid is operably coupled to the body. A connector outwardly extends from the lid and is coupled to the support extension. An engagement member is positioned within the channel and is coupled to the connector and mutually engageable with the resilient member.

20 Claims, 15 Drawing Sheets

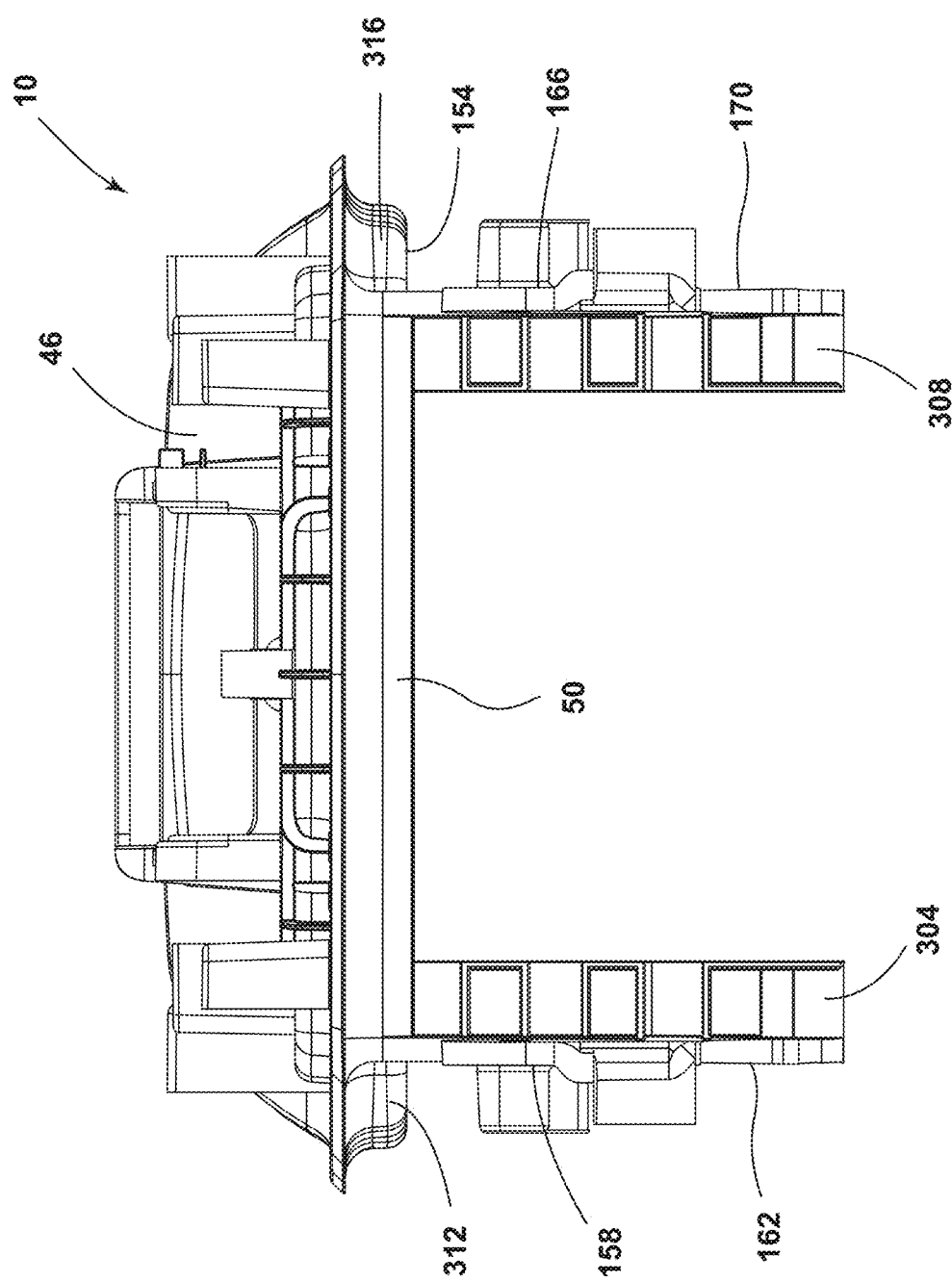

the appended claims. Hence, specific dimensions and other physical characteristics relating to the embodiments disclosed herein are not to be considered as limiting, unless the claims expressly state otherwise.

VEHICLE CONSOLE ASSEMBLY

FIELD OF THE INVENTION

The present disclosure generally relates to a console assembly. More specifically, the present disclosure relates to a vehicle console assembly having a rotatable lid.

BACKGROUND OF THE INVENTION

Vehicles often have center consoles, including an armrest lid that allows occupants within the vehicles to rest their arms and access the center console. The armrest lid is typically coupled to the console bin by a hinge assembly. In this way, the armrest lid is operable between opened and closed positions.

SUMMARY OF THE INVENTION

According to at least one aspect of the present disclosure, a console assembly for a vehicle includes a body that defines a support extension that extends from an upper portion of the body. The support extension includes a guide and a resilient member that defines a channel. A lid is operably coupled to the body. A connector is outwardly extending from the lid and is coupled to the support extension. An engagement member is positioned within the channel and is coupled to the connector and mutually engageable with the resilient member. A hinge pin extends through the guide and the engagement member. The hinge pin couples the lid to the body, and the lid rotates about the hinge pin and is operable between a raised position, a lowered position, and an intermediate position therebetween.

According to another aspect of the present disclosure, a console assembly includes a body including a first support extension and a second support extension each extending from a rear portion of the body. Each of the first and second support extensions includes a first guide and a second guide. A first resilient member has a protrusion and a first contact surface. A second resilient member has a protrusion and a second contact surface. A lid is operably coupled to the body. A connector outwardly extends from a bottom surface of the lid and is coupled to the first and second support extensions. At least one engagement member is mutually engageable with the first contact surface and the second contact surface of the first and second resilient members, respectively.

According to another aspect of the present disclosure, a console assembly includes a body that has a front portion and a rear portion. The body defines a support extension extending from a rear portion. The support extension includes a guide and a resilient member that defines a channel. A lid is operably coupled to the body. A connector outwardly extends from the lid and is coupled to the support extension. An engagement member is positioned within the channel and is coupled to the connector and mutually engageable with the resilient member.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 15 is a rear plan view of the lid for the console assembly with a first connector and a second connector, according to one example.

DETAILED DESCRIPTION OF THE PREFERRED EMBODIMENTS

Additional features and advantages of the presently disclosed device will be set forth in the detailed description which follows and will be apparent to those skilled in the art from the description, or recognized by practicing the device as described in the following description, together with the claims and appended drawings.

Figure 1:
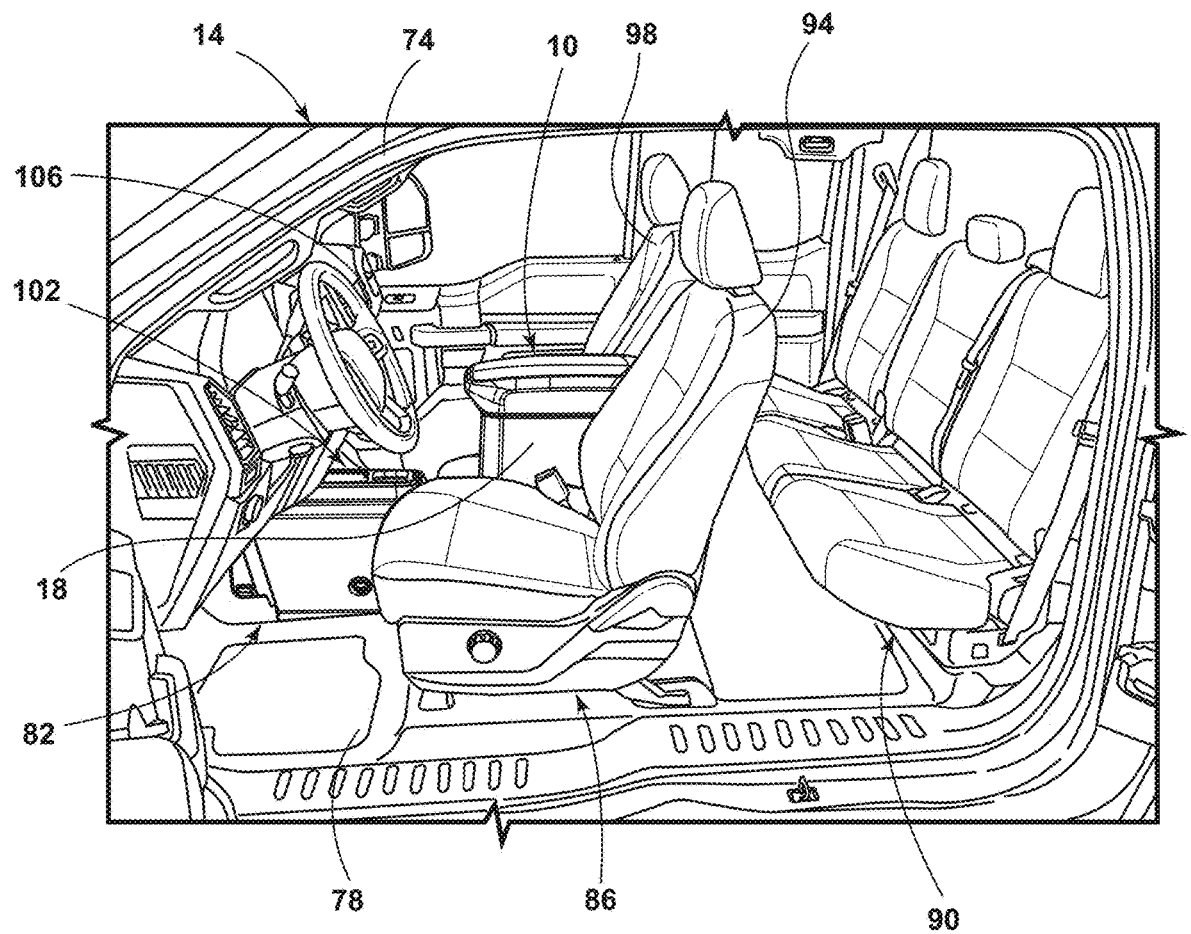
FIG. 1 is a partial side perspective view of a passenger compartment of a vehicle having a console assembly, according to one example.
Figure 2:
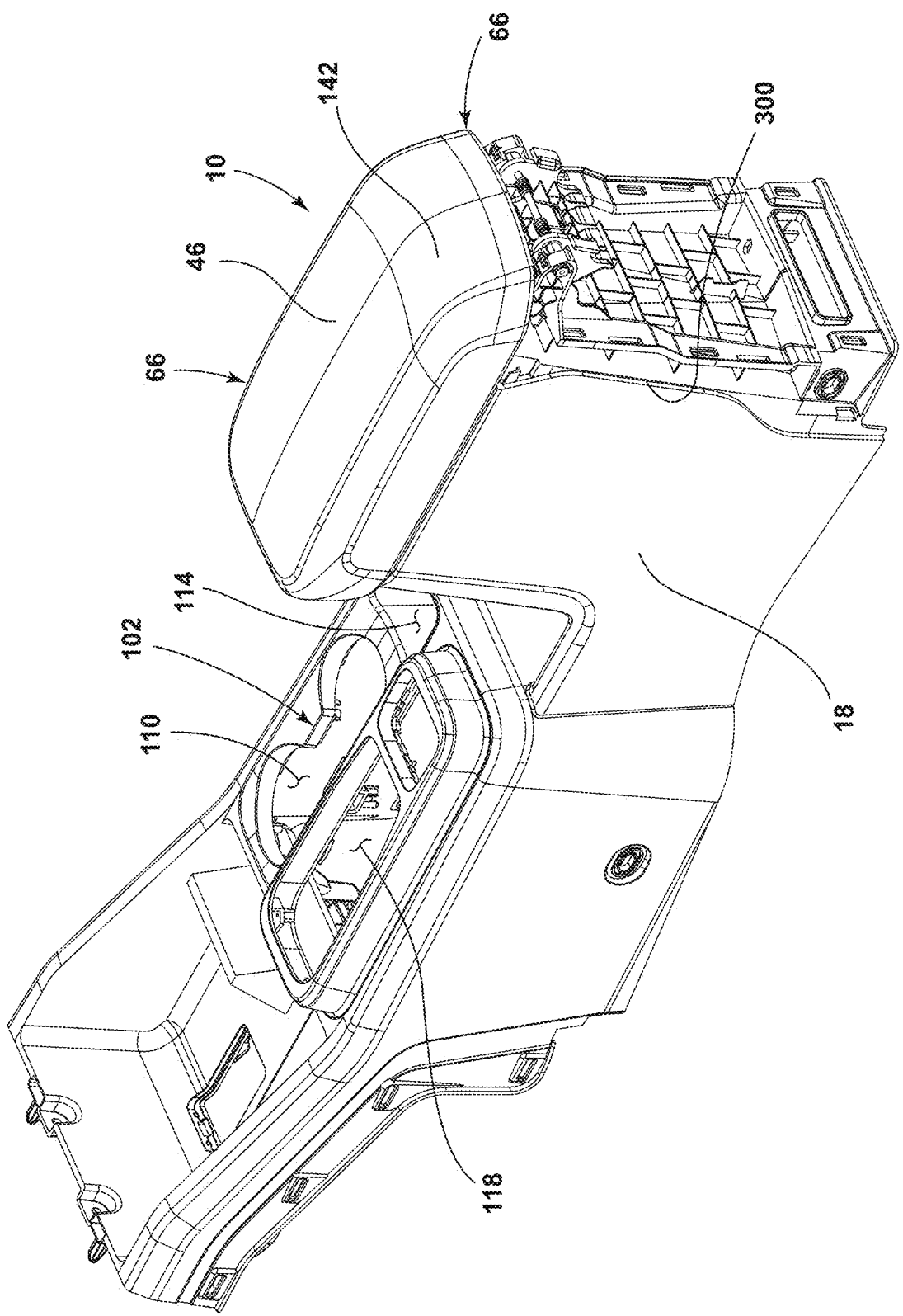
FIG. 2 is a side perspective view of the console assembly for a vehicle, according to one example.

For purposes of description herein, the terms "upper," "lower," "right," "left," "rear," "front," "vertical," "horizontal," and derivatives thereof shall relate to the disclosure as oriented in FIGS. 1 and 2. However, it is to be understood that the disclosure may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-15, reference numeral 10 generally refers to a console assembly for a vehicle 14. The console assembly 10 has a body 18 that defines a support extension 30 that extends from an upper portion 32 of the body 18. The support extension 30 includes a guide 34 and a resilient member 38 that define a channel 42. A lid 46 is operably coupled to the body 18. A connector 50 outwardly extends from the lid 46 and couples to the support extension 30. An engagement member 54 positioned within the channel 42 is coupled to the connector 50 and is mutually engageable with the resilient member 38. A hinge pin 58 extends through the guide 34 and the engagement member 54. The hinge pin 58 couples the lid 46 to the body 18. The lid 46 rotates about the hinge pin 58 and is operable between a raised position 62, a lowered position 66, and an intermediate position 70 therebetween.

Referring to FIGS. 1 and 2, the vehicle 14 includes a vehicle body 74, which defines an interior 78 of the vehicle 14 having a passenger compartment 82 therein. The passenger compartment 82 may include a first seating row 86 and a second seating row 90. Fewer or more seating rows may be included in the vehicle 14 without departing from the teachings herein. The first seating row 86 may include a driver seat 94 and a passenger seat 98. The driver and passenger seats 94, 98 may be separated by the console assembly 10. As such, the console assembly 10 in the embodiment shown is a center console assembly. The console assembly 10 may include the body 18 and a cup holder assembly 102. The cup holder assembly 102 may extend between the body 18 of the console assembly 10 and an instrument panel 106 of the vehicle 14. The cup holder assembly 102 may define one or more cup wells 110 and/or one or more receiving wells 114 for receiving other objects, such as electronics, keys, etc. The cup holder assembly 102 may also define one or more apertures 118 for receiving various controls for the vehicle 14.

While the vehicle 14, as is illustrated in FIG. 1, has the console assembly 10 between the driver seat 94 and the passenger seat 98 of the first seating row 86, it is contemplated that the console assembly 10 may be positioned in any practicable location within the passenger compartment 82 of the vehicle 14 without departing from the teachings herein. The console assembly 10 is illustrated as a center console. However, the console assembly 10 may be any console or compartment within the vehicle 14 without departing the teachings herein.

In various examples, the vehicle 14 is a wheeled motor vehicle 14, which may be a sedan, a sport utility vehicle, a truck, a van, a crossover, and/or other styles of vehicle. The vehicle 14 may be a manually operated vehicle (e.g., with a human driver), a fully autonomous vehicle (e.g., no human driver), or a partially autonomous vehicle (e.g., may be operated with or without a human driver). Additionally, the vehicle 14 may be utilized for personal and/or commercial purposes, such as ride-providing services (e.g., chauffeuring) and/or ride-sharing services.

Figure 3:
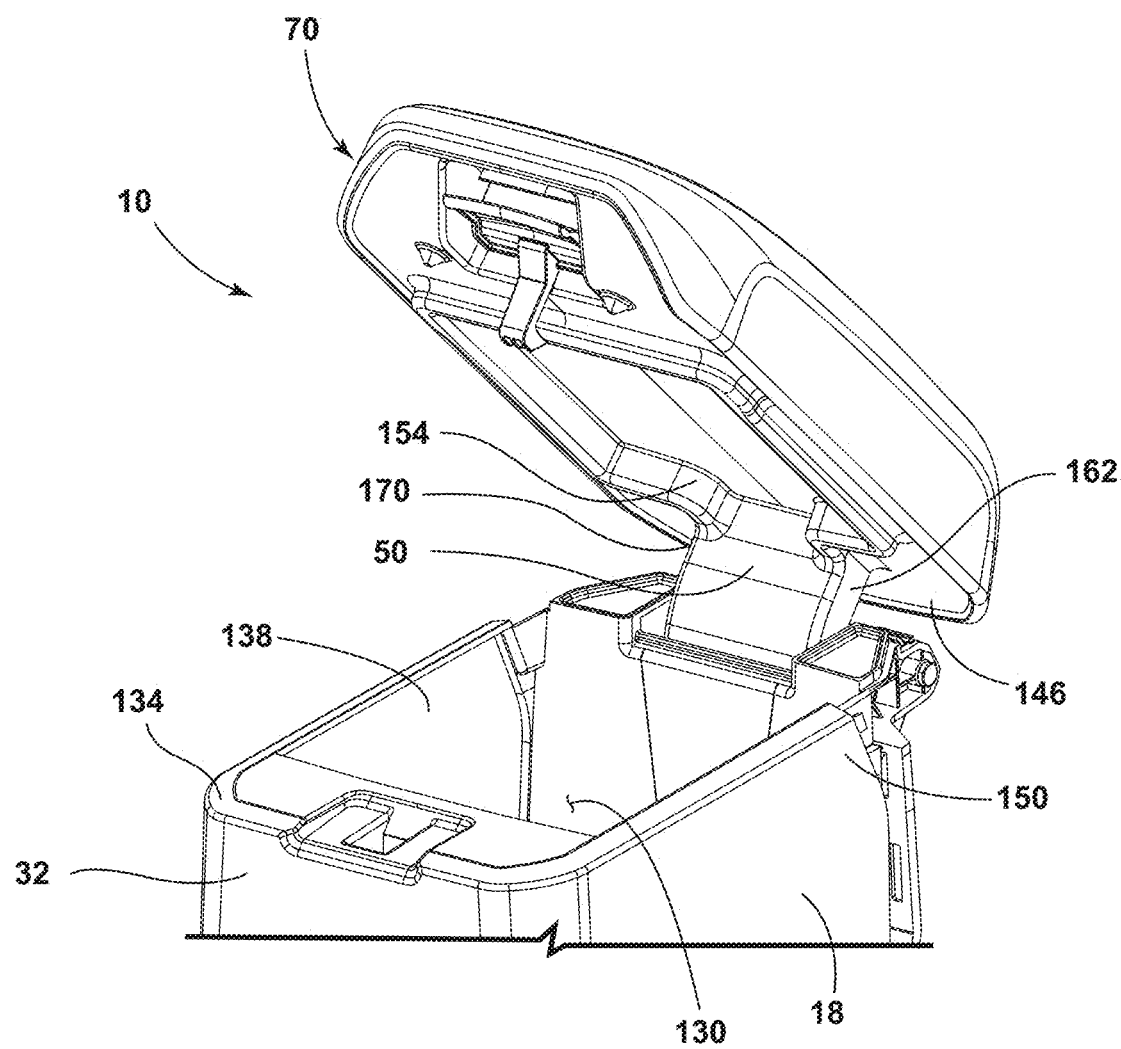
FIG. 3 is a partial front perspective view of the console assembly, according to one example.

Referring to FIGS. 2 and 3, the console assembly 10 includes the body 18, which may define an inner cavity 130 for providing storage space to occupants of the vehicle 14 (FIG. 1). The body 18 may include an upper rim 134 proximate to the upper portion 32 of the body 18. The upper rim 134 defines an opening 138, which may provide access to the inner cavity 130. The opening 138 may define a substantially rectangular shape, which may correspond with a substantially rectangular cross-sectional shape of the body 18. It is also contemplated that the body 18 may have any practical shape. Additionally or alternatively, the cup holder assembly 102 and/or the body 18 may be any practicable size, depending on the vehicle 14 (FIG. 1). When in the lowered position 66, the lid 46 may rest upon and/or be supported by the upper rim 134 of the body 18. In this way, the lid 46 may be disposed over the opening 138 of the inner cavity 130. According to various aspects, the lid 46 may include a cover 142 coupled to the lid 46. The cover 142 may be, for example, a padded layer, a cushion layer, and/or a decorative layer. This configuration may be advantageous for providing an armrest to the occupants of the vehicle 14 positioned within the driver seat 94 and/or the passenger seat 98 (FIG. 1). Further, when in the lowered position 66, the lid 46 may not interfere with access to the cup wells 110 and/or the receiving wells 114 of the cup holder assembly 102.

A first portion 146 of the lid 46 may be coupled to a rear portion 150 of the body 18. In various examples, the first portion 146 of the lid 46 and the rear portion 150 of the body 18 may be vehicle-rearward portions of the console assembly 10. This configuration may allow an occupant of the vehicle 14 to open the console assembly 10 from a vehicle-forward portion of the console assembly 10. Additionally or alternatively, the lid 46 may be coupled to the body 18 on a side or a front of the console assembly 10 to allow the occupant to open the console assembly 10 from a different orientation.

Figure 4:
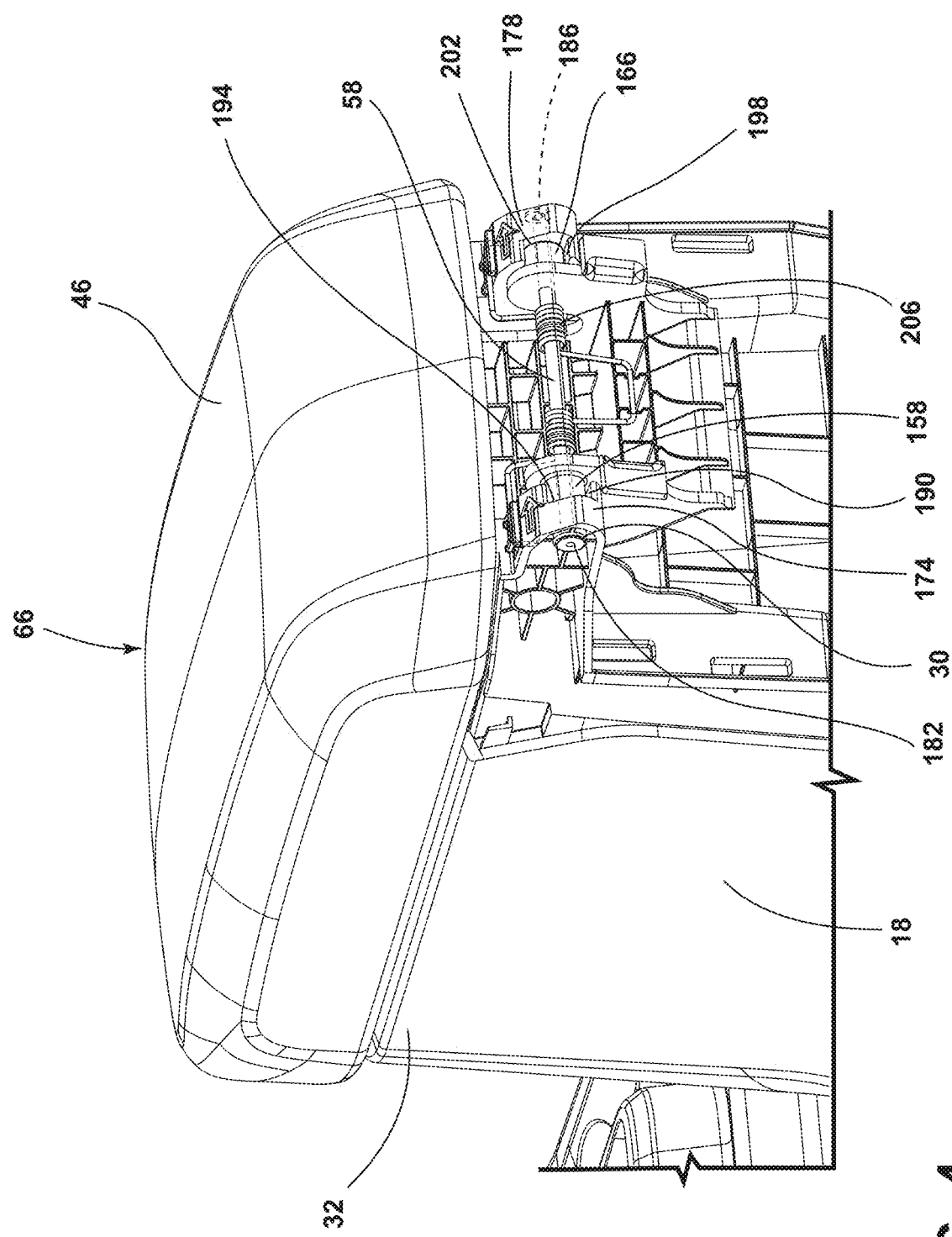
FIG. 4 is a partial rear perspective view of the console assembly, according to one example.
Figure 5:
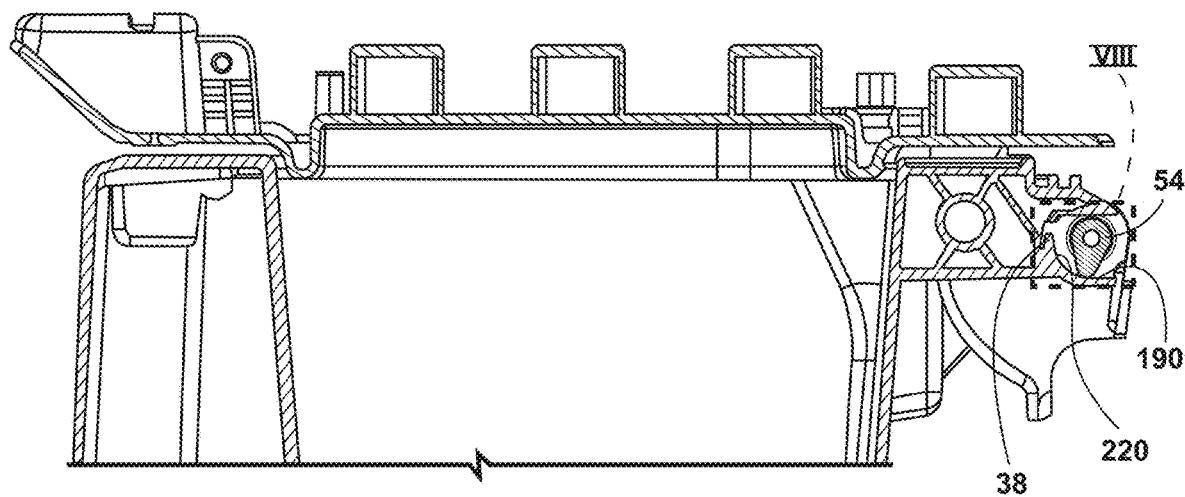
FIG. 5 is a cross-sectional view of the console assembly with a lid in a lowered position, according to one example.
Figure 6:
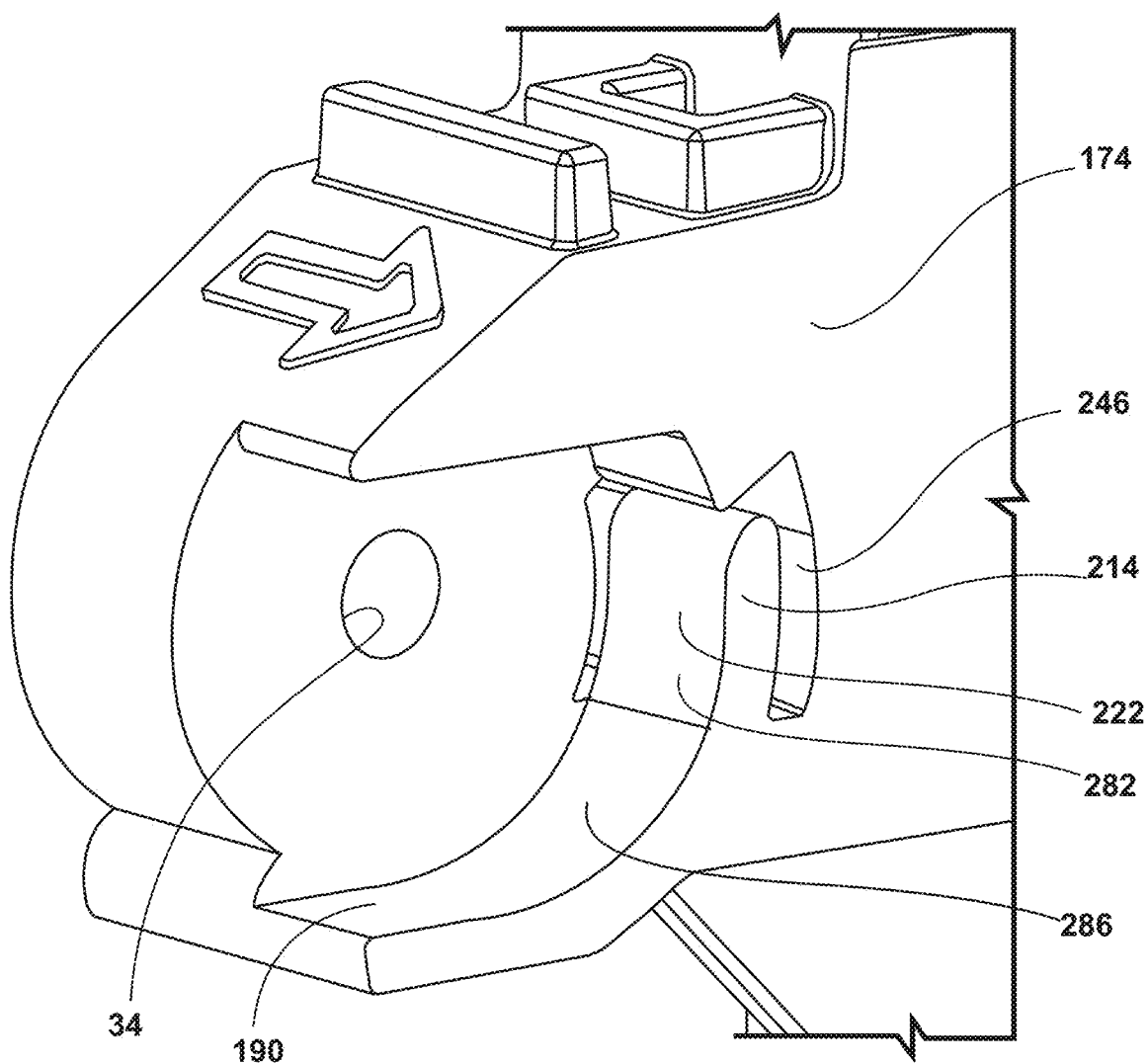
FIG. 6 is an enlarged view of a support extension with a first resilient member of the console assembly, according to one example.

Referring now to FIGS. 3 and 4, the lid 46 may include the connector 50 extending from a bottom surface 154 thereof. The connector 50 may define a first engagement member 158 on a first outer surface 162 and a second engagement member 166 on a second outer surface 170. The first and second outer surfaces 162, 170 of the connector 50 may be opposing surfaces, such that the first and second engagement members 158, 166 may extend outwards, away from one another.

The body 18 may include the support extension 30 extending outward from the upper portion 32 of the body 18 at the rear portion 150. The support extension 30 may extend in a vehicle-rearward direction from the body 18. According to various aspects, the body 18 may include a first support extension 174 and a second support extension 178. The first and second support extensions 174, 178 may be substantially mirror images of one another. Further, the first and second support extensions 174, 178 may be spaced-apart and arranged parallel to one another at the rear portion 150 of the body 18. According to various aspects, the first and second support extensions 174, 178 may respectively include a first guide 182 and a second guide 186. The first support extension 174 and first guide 182 may define a first channel 190 on a first inner surface 194 of the first support extension 174. Additionally or alternatively, the second support extension 178 and the second guide 186 may define a second channel 198 on a second inner surface 202 of the second support extension 178. In this way, the first and second channels 190, 198 are oriented inward towards one another.

Referring still to FIGS. 3 and 4, when assembled, the lid 46 is operably coupled to the body 18. According to various aspects, the first engagement member 158 may be positioned within the first channel 190 of the first support extension 174 proximate to the first guide 182. Similarly, the second engagement member 166 may be positioned within the second channel 198 of the second support extension 178 proximate to the second guide 186. The hinge pin 58 may extend through the first and second support extensions 174, 178 (e.g., through the first and second channels 190, 198) and the first and second guides 182, 186. In this way, the hinge pin 58 may couple the lid 46 to the body 18.

Figure 9:
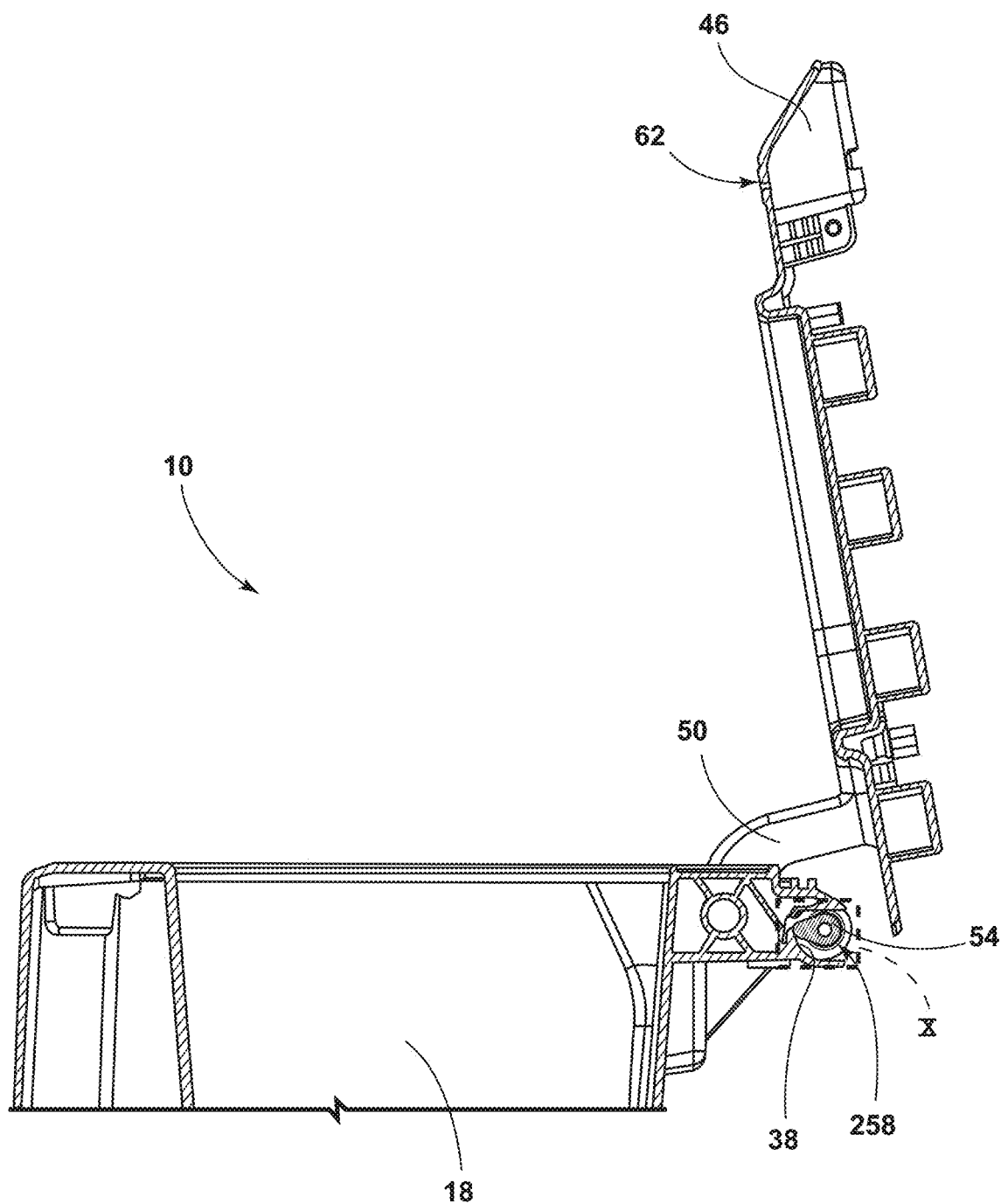
FIG. 9 is a cross-sectional view of the console assembly with the lid in a raised position, according to one example.

Moreover, in various examples, the hinge pin 58 may define a rotational axis of the lid 46. Stated differently, the lid 46 may rotate about the hinge pin 58 between the lowered position 66 and the raised position 62 (FIG. 9) with the intermediate position 70 defined therebetween. In various examples, the console assembly 10 may include a biasing member 206 disposed proximate to the connector 50. The biasing member 206 may be disposed between the first and second engagement members 158, 166. In a non-limiting example, as illustrated in FIG. 4, the biasing member 206 may be a double torsion spring. In such examples, the biasing member 206 may be configured as a double torsion spring that may experience maximum tension when the lid 46 is in the lowered position 66. As such, the biasing member 206 may bias the lid 46 toward the raised position 62 (FIG. 9). In various examples, the biasing member 206 may be operably coupled to the hinge pin 58. In this way, the hinge pin 58 may extend through the biasing member 206. Further, while the biasing member 206 is illustrated as a double torsion spring, it is contemplated that the biasing member 206 may be any practicable biasing member 206, such as, for example, springs, magnets, clock springs, or any other similar biasing device.

Referring now to FIGS. 4-7, when assembled, the first engagement member 158 may be disposed within the first channel 190. The second engagement member 166 may be similarly disposed in the second channel 198. It is generally contemplated that the resilient member 38 may further include a first resilient member 214 and a second resilient member 218. In addition, a contact surface 220 of the resilient member 38 is further contemplated to include a first contact surface 222 and a second contact surface 226 of the first and second resilient members 214, 218, respectively. The first and second resilient members 214, 218 at least partially define the first and second channels 190, 198, respectively, and upwardly extend from the respective first and second support extensions 174, 178. The first engagement member 158 may be configured to engage the first contact surface 222 of the first resilient member 214. Similarly, the second engagement member 166 may be configured to engage the second contact surface 226 of the second resilient member 218. The first and second resilient members 214, 218 are contemplated to have substantially similar construction and function.

Referring now to FIGS. 5-8, the first engagement member 158 may be substantially teardrop shaped, such that a first portion 230 has a wide diameter 234 and a second portion 238 has a narrow diameter 242. Accordingly, the second portion 238 of the first engagement member 158 may more precisely engage with the first resilient member 214. The second engagement member 166 may be similarly constructed and may operate in a similar manner with the second resilient member 218. The resilient member 38 may be formed from a substantially flexibly resilient material such as plastic and may generally define a living hinge that articulates with the engagement member 54. It is also contemplated that the resilient member 38 may be formed from other materials having flexibly resilient properties.

The first resilient member 214 may define a space 246 between the first support extension 174 and the first resilient member 214. The first resilient member 214 may extend into the space 246 during a mutual engagement with the first engagement member 158. The second resilient member 218 may be similarly configured to define a similar space 246 and may operate in a similar manner with the second engagement member 166. In addition, the first channel 190 may have a generally C-shaped configuration, such that the first engagement member 158 may rotate within the first channel 190 to engage with the first resilient member 214. The second channel 198 may be similarly configured and may operate in a similar manner in relation to the second engagement member 166 and the second resilient member 218.

Figure 8:
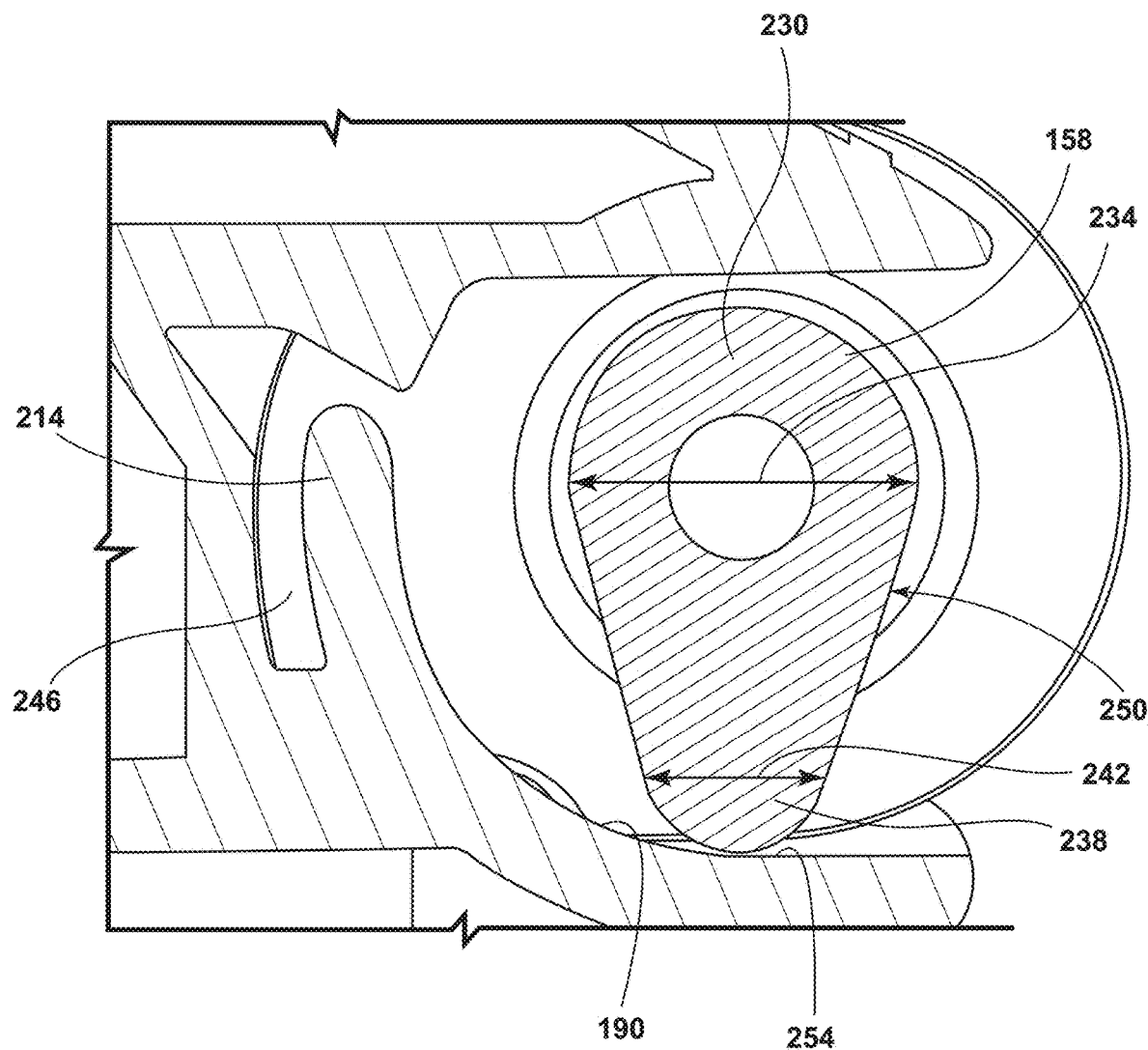
FIG. 8 is an enlarged view of an engagement member and a resilient member of the console assembly of FIG. 5 taken at area VIII.
Figure 10:
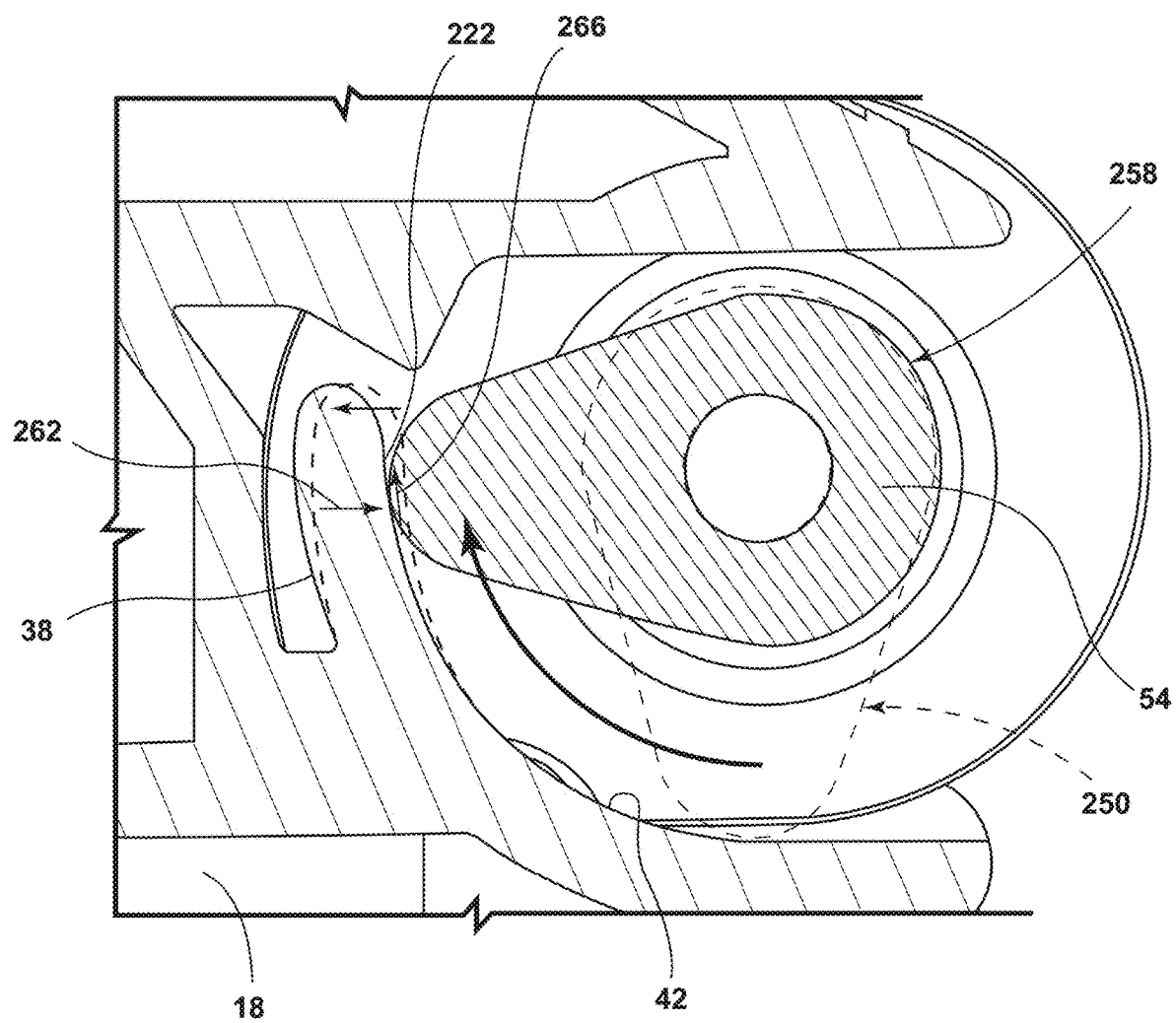
FIG. 10 is an enlarged view of an engagement member and a resilient member of the console assembly of FIG. 9 taken at area X.

Referring now to FIGS. 8-10, as described herein the second resilient member 218 and second engagement member 166 may have a substantially similar configuration, construction, and function of the first resilient member 214 and the first engagement member 158, respectively. A disengaged position 250 may be defined by the first engagement member 158 as illustrated in FIG. 8. While in the disengaged position 250, the first engagement member 158 may be normal to a planar portion 254 of the first channel 190. As the lid 46 raises, the first engagement member 158 engages with the first contact surface 222 (FIG. 6) of the first resilient member 214, which results in a frictional interference, to define an engaged position 258 of the first resilient member 214. While the first resilient member 214 is in the engaged position 258, the lid 46 may be either in the intermediate (FIG. 3) or raised positions 70, 62.

With reference to FIGS. 9 and 10, the engagement member 54 is illustrated as pressing against the resilient member 38 as the lid 46 transitions from the intermediate position 70 (FIG. 3) to the raised position 62. The resilient member 38 flexibly extends towards the body 18 of the console assembly 10, which may provide sufficient extension of the resilient member 38 to allow the lid 46 to open. As the lid 46 reaches the raised position 62, the resilient member 38 mutually engages the engagement member 54 to retain the lid 46 in the raised position 62. Accordingly, there is a resistive force 262 acting on the engagement member 54 stabilizing the lid 46 in the raised position 62. In addition, a frictional force 266 is defined between the engagement member 54 and the resilient member 38 when the resilient member 38 is in the engaged position 258. The frictional force 266 further contributes to the stabilization of the engagement member 54 against the resilient member 38 and, ultimately, the stabilization of the lid 46 in the raised position 62. The frictional force 266 may be at its greatest level of resistance when the lid 46 is in the raised position 62 and the engagement member 54 is fully engaged with the resilient member 38. While the engagement member 54 rotates within the channel 42, the frictional force 266 may help to slow the rotational movement of the engagement member 54 and, consequently, the lid 46.

Figure 7:
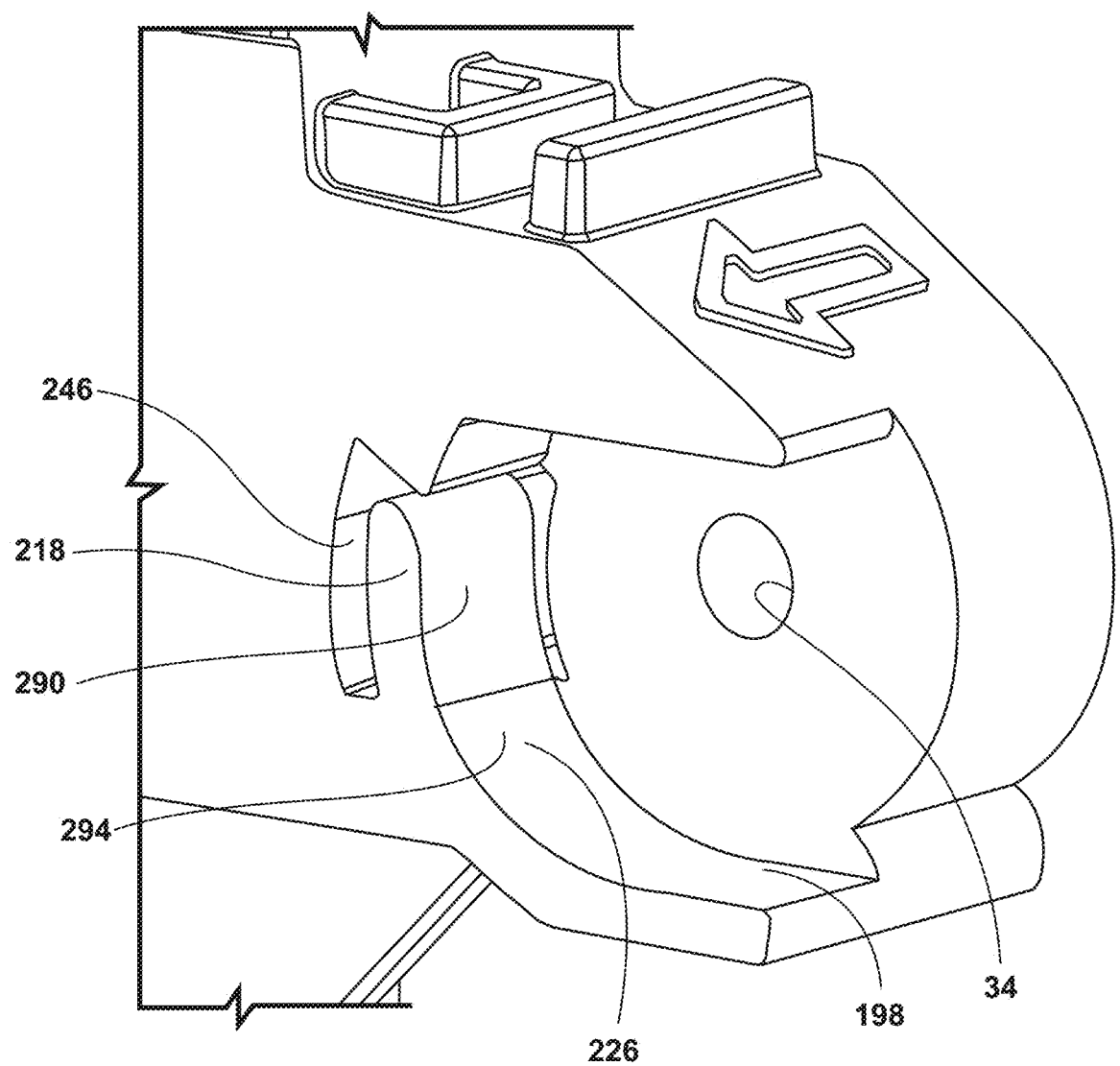
FIG. 7 is an enlarged view of a support extension with a second resilient member of the console assembly, according to one example.
Figure 11:
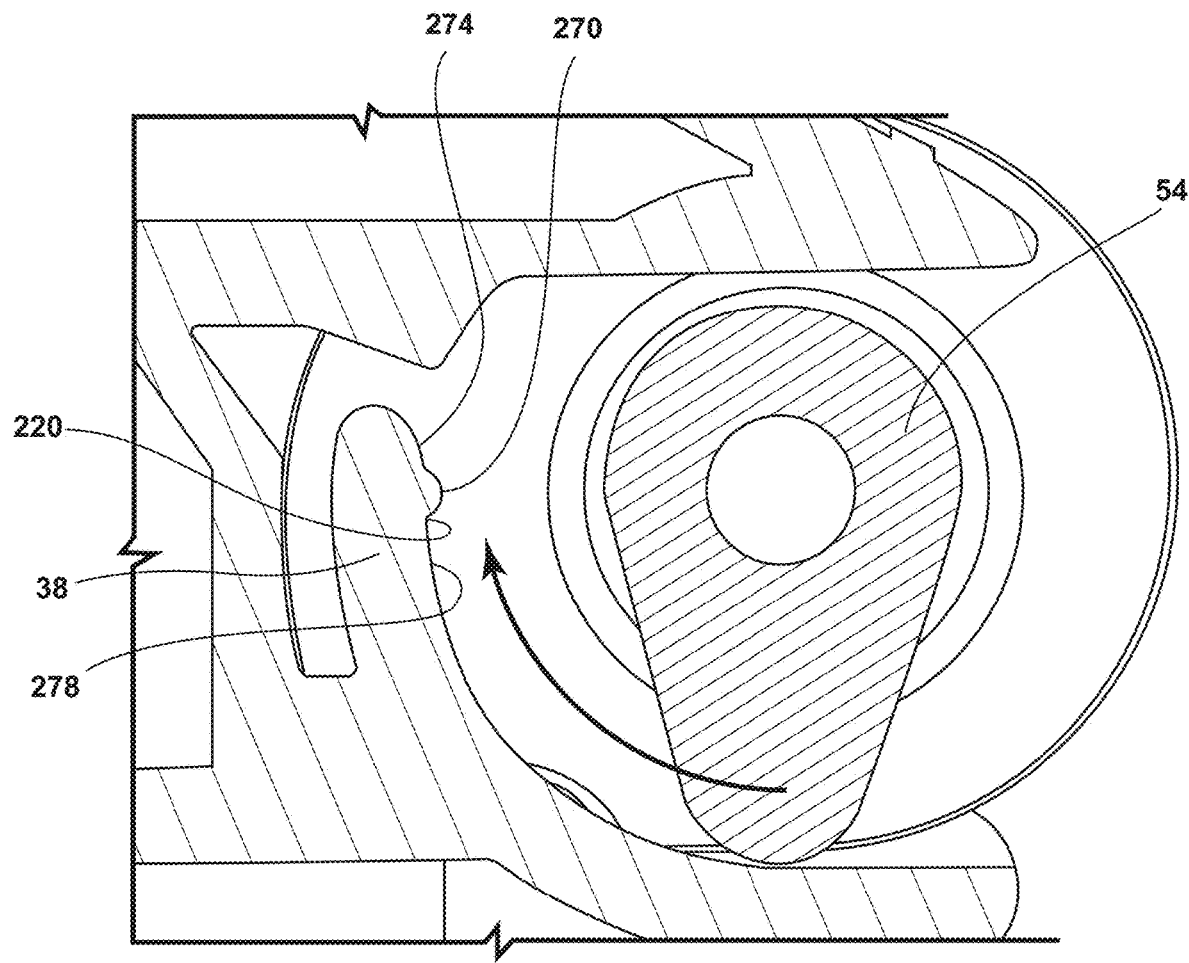
FIG. 11 is an enlarged view of a resilient member with a protrusion, according to one example.
Figure 12:
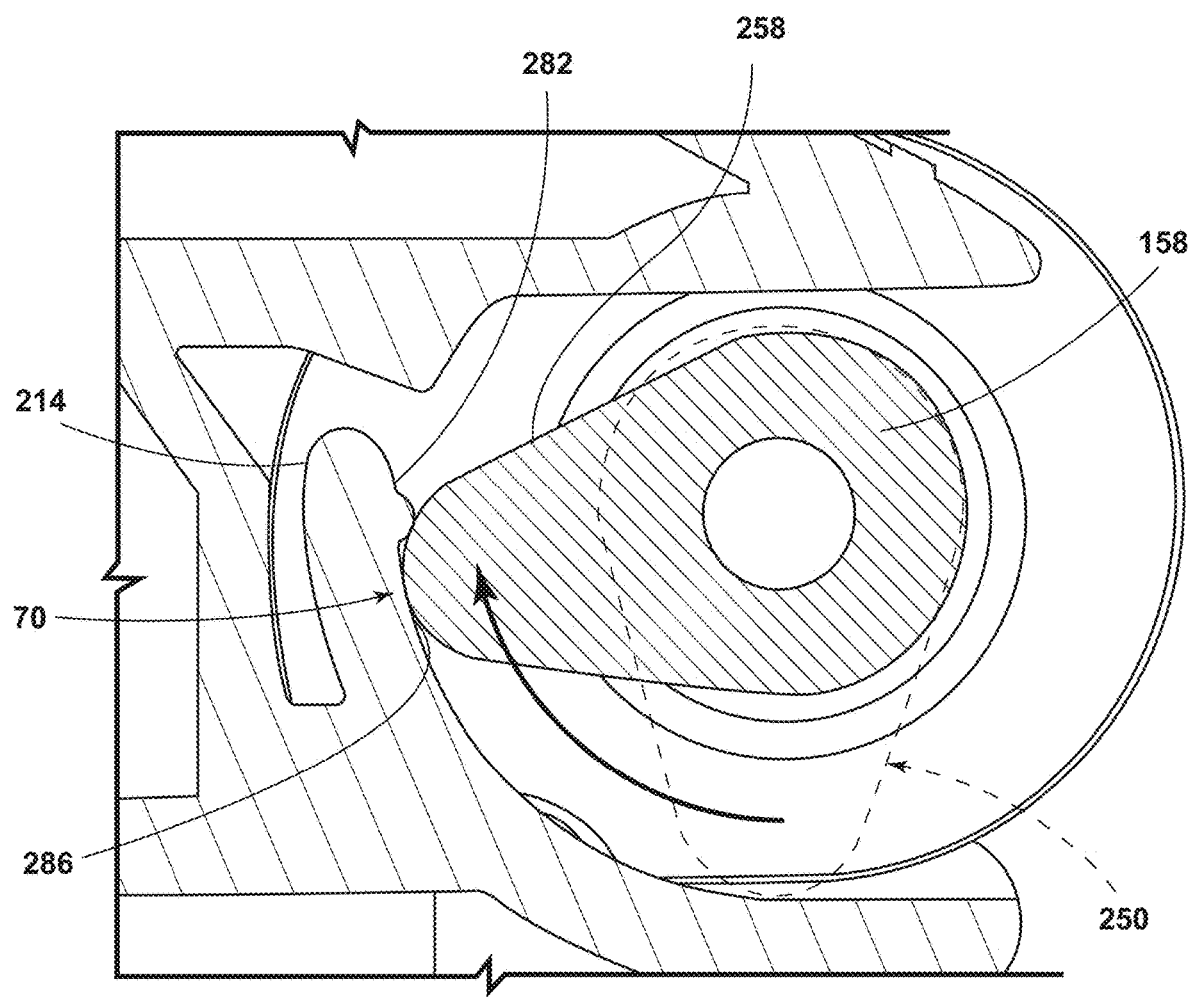
FIG. 12 is an enlarged view of an engagement member and a resilient member in an intermediate position, according to one example.
Figure 13:
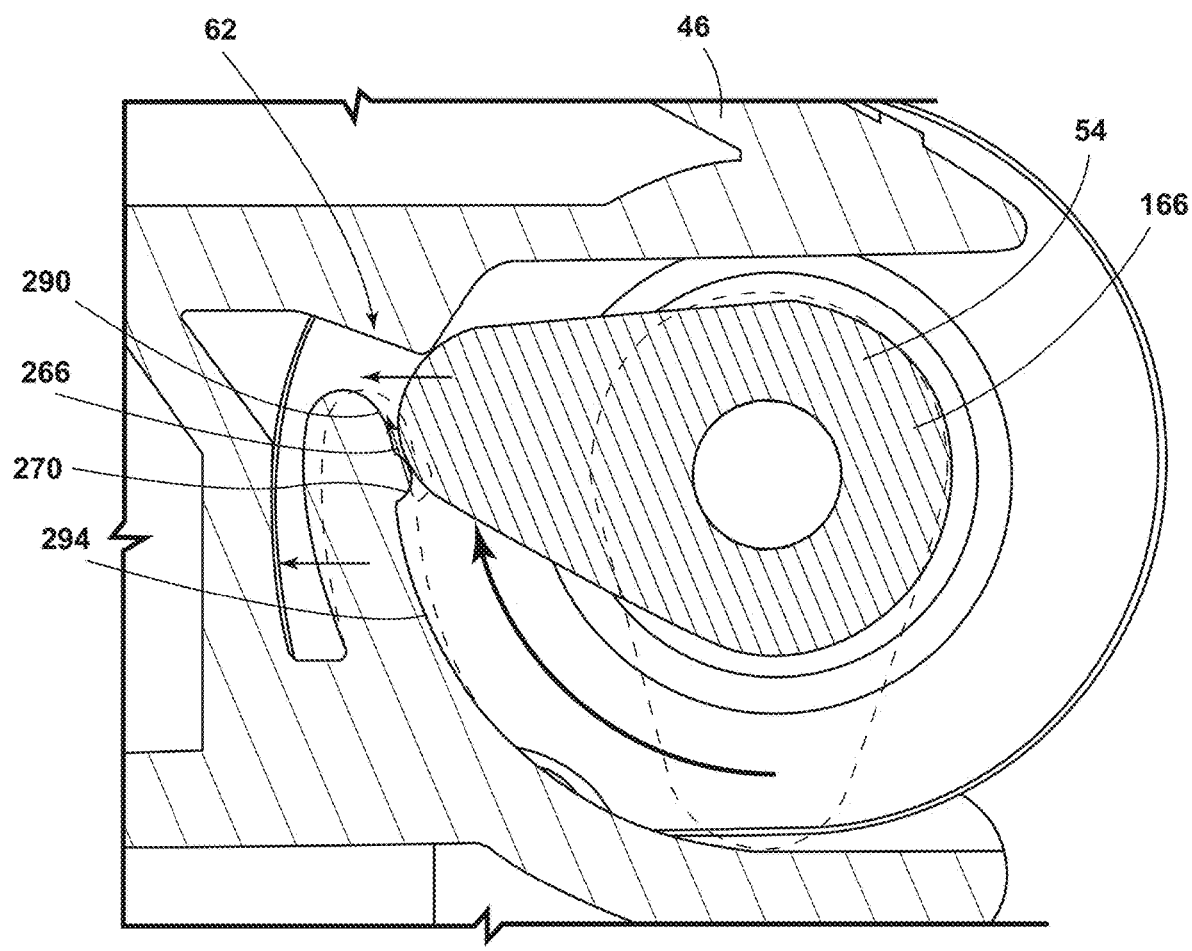
FIG. 13 is an enlarged view of the engagement member and resilient member of FIG. 12 in a raised position.

Referring to FIGS. 11-13, the resilient member 38 may further include a protrusion 270 that may also be mutually engageable with the engagement member 54. The protrusion 270 may define an upper engagement surface 274 and a lower engagement surface 278 of the resilient member 38, such that the contact surface 220 may be divided into the upper and lower engagement surfaces 274, 278 by the protrusion 270. Additionally or alternatively, the first and second resilient members 214, 218 may each include the protrusion 270. The protrusion 270 of the first resilient member 214 may define a first upper engagement surface 282 and a first lower engagement surface 286 (FIG. 6), while the protrusion 270 of the second resilient member 218 may define a second upper engagement surface 290 and a second lower engagement surface 294 (FIG. 7). As described herein the second upper engagement surface 290 and the second lower engagement surface 294 may have a substantially similar configuration, construction, and function of the first upper engagement surface 282 and the first lower engagement surface 286, respectively.

During the rotation of the lid 46, the first and second engagement members 158, 166 frictionally engage the upper and lower engagement surfaces 274, 278 of the first and second resilient members 214, 218, respectively. Specifically, as the lid 46 transitions in the intermediate position 70, the first engagement member 158 may frictionally engage the first lower engagement surface 286. In addition, when the lid 46 is in the intermediate position 70, the second engagement member 166 may frictionally engage the second lower engagement surface 294. As the lid 46 enters the raised position 62, the first engagement member 158 presses upon the protrusion 270 of the first resilient member 214 and the first resilient member 214 may then be transitioned into the engaged position 258. A similar exchange may take place between the second engagement member 166 and the protrusion 270 of the second resilient member 218.

Once the lid 46 is in the raised position 62, the first and second resilient members 214, 218 are in mutual engagement with the first and second engagement members 158, 166. Accordingly, the frictional force 266 may be defined between the first engagement member 158 and the first upper engagement surface 282 and may be defined between the second engagement member 166 and the second upper engagement surface 290. By way of example, not limitation, FIG. 13 illustrates the second engagement member 166 frictionally engaged with the second upper engagement surface 290 in the raised position 62. The first engagement member 158 similarly frictionally engages the first upper engagement surface 282 in the raised position 62. In addition to the frictional force 266, the protrusion 270 provides additional stability for the engagement member 54. The engagement member 54, although frictionally engaged with the resilient member 38, may rest on the protrusion 270 to create further resistance for the lid 46. By way of example, not limitation, the lid 46 may be bumped by an occupant while in the raised position 62, and the protrusion 270 may engage with the engagement member 54 to resist the downward rotation of the engagement member 54 and, consequently, the lid 46.

Figure 14:
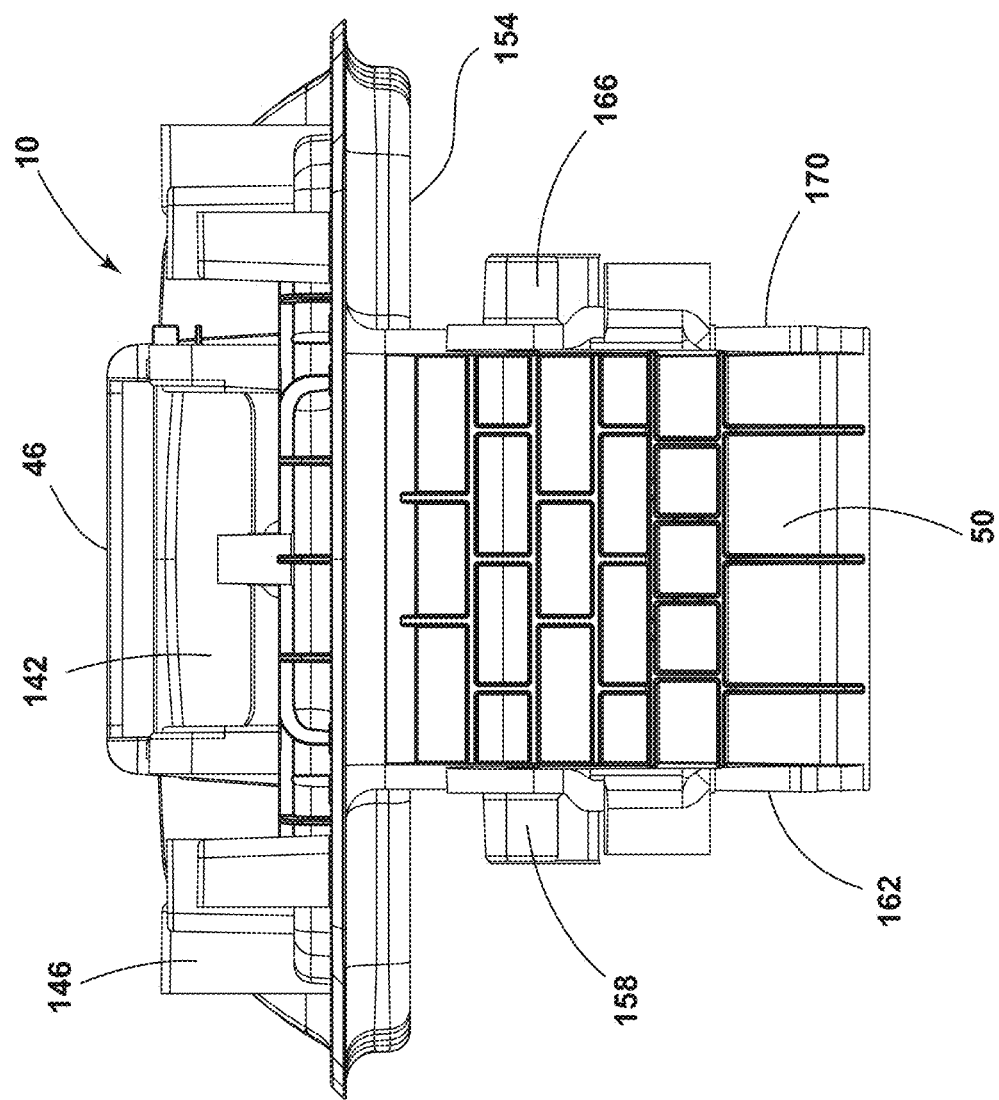
FIG. 14 is a rear plan view of the lid of the console assembly with a connector, according to one example.

Referring to FIGS. 14 and 15, the connector 50 may extend from the bottom surface 154 of the first portion 146 of the lid 46. The connector 50 may extend between the first and second engagement members 158, 166. In this way, the first and second outer surfaces 162, 170 may be opposing surfaces of a single connector 50. This configuration of the connector 50 may be advantageous for extending the cover 142 over an end 300 (FIG. 2) of the console assembly 10. The extended cover 142 may be advantageous for increasing the aesthetics of the console assembly 10. The extended cover 142 may provide additional padded layers, cushion layers, and/or decorative layers on the console assembly 10.

In addition, the lid 46 may include a first connector 304 and a second connector 308. In various examples, the first engagement member 158 may extend from the first connector 304 and the second engagement member 166 may extend from the second connector 308. According to various aspects, the first and second connectors 304, 308 may extend from the bottom surface 154 of the first portion 146 of the lid 46. Additionally or alternatively, the first connector 304 may extend from a first side 312 of the lid 46 and the second connector 308 may extend from a second side 316 of the lid 46. The first and second connectors 304, 308 may be spaced apart from one another and may extend substantially parallel to one another. This configuration of the lid 46 may be advantageous for providing additional space proximate the end 300 of the console assembly 10. The additional space may be advantageous for increased storage for the occupants of the vehicle 14. The additional space may also be advantageous for including additional cup wells 110 (FIG. 2) proximate the end 300 of the console assembly 10, which may be accessible to occupants within the second seating row 90 (FIG. 1).

Use of the presently disclosed device may provide for a variety of advantages. For example, the resilient member 38 may help control the overall movement of the lid 46, such that the lid 46 is less likely to wobble in the raised position 62 or slam shut into the lowered position 66. This may also minimize excess noise that may otherwise be present in a conventional console absent the resilient member 38. Thus, the console assembly 10 described herein provides improved user experience and more smooth transitory movement of the lid 46.

According to various examples, a console assembly for a vehicle includes a body defines a support extension that extends from an upper portion of the, and the support extension includes a guide and a resilient member that defines a channel. A lid is operably coupled to the body. A connector is outwardly extending from the lid and is coupled to the support extension. An engagement member is positioned within the channel and is coupled to the connector and mutually engageable with the resilient member. A hinge pin extends through the guide and the engagement member. The hinge pin couples the lid to the body, and the lid rotates about the hinge pin and is operable between a raised position, a lowered position, and an intermediate position therebetween. Embodiments of the present disclosure may include one or a combination of the following features:

A resilient member including a protrusion. The protrusion is mutually engageable with an engagement member.

A protrusion defines an upper engagement surface and a lower engagement surface of a resilient member. An engagement member is frictionally engaged with the upper engagement surface in a raised position.

A frictional force defines between a resilient member and an engagement member at least in an intermediate position.

A resilient member is in an engaged position relative to an engagement member. The engaged position corresponds to one of a raised position and an intermediate position of a lid.

A resilient member is in a disengaged position relative to an engagement member. The disengaged position corresponds to a lowered position of a lid.

A resilient member includes a contact surface. An engagement member is frictionally engaged with the contact surface in a raised position and an intermediate position.

According to various examples, a console assembly includes a body including a first support extension and a second support extension each extending from a rear portion of the body. Each of the first and second support extensions includes a first guide and a second guide. A first resilient member has a protrusion and a first contact surface. A second resilient member has a protrusion and a second contact surface. A lid is operably coupled to the body. A connector outwardly extends from a bottom surface of the lid and is coupled to the first and second support extensions. At least one engagement member is mutually engageable with the first contact surface and the second contact surface of the first and second resilient members, respectively. Embodiments of the present disclosure may include one or a combination of the following features:

A hinge pin extends through a first guide and a second guide and couples a lid to a body. The lid rotates about a hinge pin and is operable between a raised position, a lowered position, and an intermediate position therebetween.

A protrusion of a first resilient member defines a first upper engagement surface and a first lower engagement surface of a first contact surface. The protrusion of a second resilient member further defines a second upper engagement surface and a second lower engagement surface of a second contact surface.

At least one engagement member includes a first and a second engagement member. The first and second engagement members respectively frictionally engage a first and second lower engagement surface of a first and second resilient member in an intermediate position of a lid. The first and second engagement members respectively frictionally engage a first and second upper engagement surface in a raised position of the lid.

At least one engagement member includes a first engagement member and a second engagement member. The first and second engagement members are coupled to a connector.

A first resilient member, a second resilient member, a first guide, and a second guide defines a first channel and a second channel in which first and second engagement members are positioned.

A first and second engagement member frictionally engage a first and second contact surface. First and second resilient members are translated into an engaged position during a frictional engagement.

According to various examples, a console assembly includes a body that has a front portion and a rear portion. The body defines a support extension extending from a rear portion. The support extension includes a guide and a resilient member that defines a channel. A lid is operably coupled to the body. A connector outwardly extends from the lid and is coupled to the support extension. An engagement member is positioned within the channel and is coupled to the connector and mutually engageable with the resilient member. Embodiments of the present disclosure may include one or a combination of the following features:

A hinge pin extends through a guide and an engagement member. A lid rotates about the hinge pin and is operable between a raised position, a lowered position, and an intermediate position.

An engagement member frictionally engages a resilient member in either an open and intermediate positions.

A resilient member is in an engaged position when a lid is in a raised position. The resilient member is in a disengaged position when the lid is in a lowered position.

A protrusion defines an upper engagement surface and a lower engagement surface of a resilient member.

An engagement member frictionally engages a lower engagement surface of a resilient member in an intermediate position of a lid. The engagement member frictionally engages an upper engagement surface in a raised position of the lid.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A console assembly for a vehicle, comprising:
    a body defining a support extension extending from an upper portion of the body, and wherein the support extension includes a guide and a resilient member that define a channel;
    a lid operably coupled to the body;
    a connector outwardly extending from the lid and coupled to the support extension;
    an engagement member positioned within the channel and coupled to the connector and mutually engageable with the resilient member; and
    a hinge pin extending through the guide and the engagement member, wherein the hinge pin couples the lid to the body, and wherein the lid rotates about the hinge pin and is operable between a raised position, a lowered position, and an intermediate position therebetween.

2. The console assembly of claim 1, wherein the resilient member further includes a protrusion, wherein the protrusion is mutually engageable with the engagement member.

3. The console assembly of claim 2, wherein the protrusion defines an upper engagement surface and a lower engagement surface of the resilient member, and wherein the engagement member is frictionally engaged with the upper engagement surface in the raised position.

4. The console assembly of claim 1, wherein a frictional force is defined between the resilient member and the engagement member at least in the intermediate position.

5. The console assembly of claim 1, wherein the resilient member is in an engaged position relative to the engagement member, and wherein the engaged position corresponds to one of the raised position and the intermediate position of the lid.

6. The console assembly of claim 1, wherein the resilient member is in a disengaged position relative to the engagement member, wherein the disengaged position corresponds to the lowered position of the lid.

7. The console assembly of claim 1, wherein the resilient member includes a contact surface, and wherein the engagement member is frictionally engaged with the contact surface in the raised position and the intermediate position.

8. A console assembly, comprising:
    a body including a first support extension and a second support extension each extending from the body, wherein each of the first and second support extensions includes first and second guides and a first resilient member having a protrusion and a first contact surface, and a second resilient member having a protrusion and a second contact surface;
    a lid operably coupled to the body;
    a connector outwardly extending from a bottom surface of the lid and coupled to the first and second support extensions; and
    at least one engagement member mutually engageable with the first contact surface and the second contact surface of the first and second resilient members, respectively.

9. The console assembly of claim 8, wherein a hinge pin extends through the first and second guides and couples the lid to the body, and wherein the lid rotates about the hinge pin and is operable between a raised position, a lowered position, and an intermediate position therebetween.

10. The console assembly of claim 9, wherein the protrusion of the first resilient member further defines a first upper engagement surface and a first lower engagement surface of the first contact surface, and wherein the protrusion of the second resilient member further defines a second upper engagement surface and a second lower engagement surface of the second contact surface.

11. The console assembly of claim 10, wherein the at least one engagement member includes a first and a second engagement member, wherein the first and second engagement members respectively frictionally engage the first and second lower engagement surfaces of the first and second resilient members in the intermediate position of the lid, and wherein the first and second engagement members respectively frictionally engage the first and second upper engagement surfaces in the raised position of the lid.

12. The console assembly of claim 8, wherein the at least one engagement member includes a first engagement member and a second engagement member, and wherein the first and second engagement members are coupled to the connector.

13. The console assembly of claim 12, wherein the first and second resilient members and the first and second guides respectively define a first channel and a second channel in which the first and second engagement members are respectively positioned.

14. The console assembly of claim 12, wherein the first and second engagement members frictionally engage the first and second contact surfaces, respectively, and wherein the first and second resilient members are translated into an engaged position during the frictional engagement.

15. A console assembly, comprising:
    a body having a rear portion, wherein the body defines a support extension extending from the rear portion, and wherein the support extension includes a guide and a resilient member that define a channel;
    a lid operably coupled to the body;
    a connector outwardly extending from the lid and coupled to the support extension; and
    an engagement member positioned within the channel and coupled to the connector and mutually engageable with the resilient member.

16. The console assembly of claim 15, further including:
    a hinge pin extending through the guide and the engagement member, wherein the lid rotates about the hinge pin and is operable between a raised position, a lowered position, and an intermediate position.

17. The console assembly of claim 16, wherein the engagement member frictionally engages the resilient member in either the open and intermediate positions.

18. The console assembly of claim 16, wherein the resilient member is in an engaged position when the lid is in the raised position, and wherein the resilient member is in a disengaged position when the lid is in the lowered position.

19. The console assembly of claim 16, wherein a protrusion defines an upper engagement surface and a lower engagement surface of the resilient member.

20. The console assembly of claim 19, wherein the engagement member frictionally engages the lower engagement surface of the resilient member in the intermediate position of the lid, and wherein the engagement member frictionally engages the upper engagement surface in the raised position of the lid.

\* \* \* \* \*